United States Patent [19]

Kise et al.

[11] Patent Number: 5,528,752
[45] Date of Patent: Jun. 18, 1996

[54] FAULT DIAGNOSIS USING SIMULATION

[75] Inventors: Takashi Kise, Yokohama; Koichi Masegi, Machida; Makoto Murata, Sendai, all of Japan

[73] Assignee: Canon Kabushiki Kaisha, Tokyo, Japan

[21] Appl. No.: 347,174

[22] Filed: Nov. 22, 1994

Related U.S. Application Data

[63] Continuation of Ser. No. 819,190, Jan. 10, 1992, abandoned.

[30] Foreign Application Priority Data

Jan. 11, 1991 [JP] Japan .................................... 3-002206
Feb. 28, 1991 [JP] Japan .................................... 3-034743

[51] Int. Cl.$^6$ .................................................. G06F 11/00
[52] U.S. Cl. ............................. 395/183.05; 395/183.02; 395/183.03; 395/183.09; 364/221.2; 364/232.3; 364/264.3
[58] Field of Search ........................... 371/23, 5.1, 15.1, 371/16.1, 16.2, 16.4, 16.5, 25.1, 29.1, 29.5; 364/221.2, 232.3, 237.2, 264.3; 395/183.02, 183.03, 183.05, 183.09

[56] References Cited

U.S. PATENT DOCUMENTS

| | | | |
|---|---|---|---|
| 4,156,132 | 5/1979 | Hazzard .................................... | 235/302 |
| 4,228,537 | 10/1980 | Henckels et al. ........................ | 371/23 |
| 4,242,751 | 12/1980 | Henckels et al. ........................ | 371/25 |
| 4,268,905 | 5/1981 | Johann et al. ........................... | 371/21.1 |
| 4,509,110 | 4/1985 | Levesque, Jr. et al. ................. | 364/153 |
| 4,620,286 | 10/1986 | Smith et al. ............................. | 364/513 |
| 4,752,890 | 6/1988 | Natarajan et al. ...................... | 364/513 |
| 4,939,680 | 7/1990 | Yoshida .................................... | 364/513 |
| 4,996,659 | 2/1991 | Yamaguchi et al. .................... | 364/579 |
| 5,101,349 | 3/1992 | Tokuume et al. ....................... | 364/419 |
| 5,107,497 | 4/1992 | Lirov et al. .............................. | 371/15.1 |
| 5,123,017 | 6/1992 | Simpkins et al. ....................... | 371/15.1 |
| 5,127,005 | 6/1992 | Oda et al. ................................. | 371/15.1 |
| 5,146,583 | 9/1992 | Matsunaka et al. .................... | 395/500 |
| 5,166,934 | 11/1992 | Tomiyama et al. ..................... | 371/16.4 |
| 5,214,577 | 5/1993 | Sztipanovits ............................ | 371/23 |
| 5,272,704 | 12/1993 | Tong et al. ............................... | 371/23 |

FOREIGN PATENT DOCUMENTS 0364151  4/1990  European Pat. Off. .

OTHER PUBLICATIONS

"Diagnosing Multiple Faults" by Johan de Kleer et al.; Artificial Intelligence; Sep. 1985; pp. 97–130.
Exploring Artificial Intelligence: Survey Talks form the National Conferences on Artificial Intelligence, 1988, ISBN 0-934613-67-2, chapter 8, R. Davis & W. Hamscher; "Model–based Reasoning: Trouble-shooting" pp. 297–348.

(List continued on next page.)

Primary Examiner—Robert W. Beausoliel, Jr.
Assistant Examiner—Dieu-Minh Le
Attorney, Agent, or Firm—Fitzpatrick, Cella, Harper & Scinto

[57] ABSTRACT

In a fault diagnosis or a process simulation arrangement, data is held on first interactions between attributes of a part and between attributes of a parent part and a child part according to object parts in a parts data base. Data on an order for executing processes and data on a process model describing each process operation as second interactions between attributes of a medium and a part used in the process operation are held in a process model memory. In the fault diagnosis, fault statuses of attributes of parts and media used in each process are determined as candidates for causes of effecting statuses of attributes corresponding to the fault of the following process in reverse order of the execution order held in the process model memory using model based reasoning by referring to the first and second interaction relationships and statuses of attributes of the parts and the media determined in the following process. The attributes of the parts and the media may be expressed as a tree structure. The simulation is performed by determining statuses of attributes of parts and media used in each process sequentially in the execution order held in the process model memory using model based reasoning by referring to the first and second interactions and statuses of the parts and media determined in a preceding process.

11 Claims, 18 Drawing Sheets

OTHER PUBLICATIONS

Database Compuscience, No. 89(4): CS15610; International Journal of Intelligent Systems, 1988, vol. 3, E. Hudlicka "Construction and Use of a Causal Model for Diagnosis" Fachinformationszentrum Karlsruhe, BRD, pp. 315–349—Abstract—.

Database Compuscience, No. 88(12); MA 1975; Artiicial Intelligence, 1987 vol. 32, J. DeKleer "Diagnosing multiple faults" Fachinformationszentrum Karlsruhe, BRD, pp. 97–130 pp. 315–349—Abstract—.

"Model–based Reasoning: Troubleshooting" by Randall Davis et al. Exploring Artificial Intelligence; Morgan Kaufmann Publishers, Inc. San Mateo, CA.; 1988 pp. 297–346.

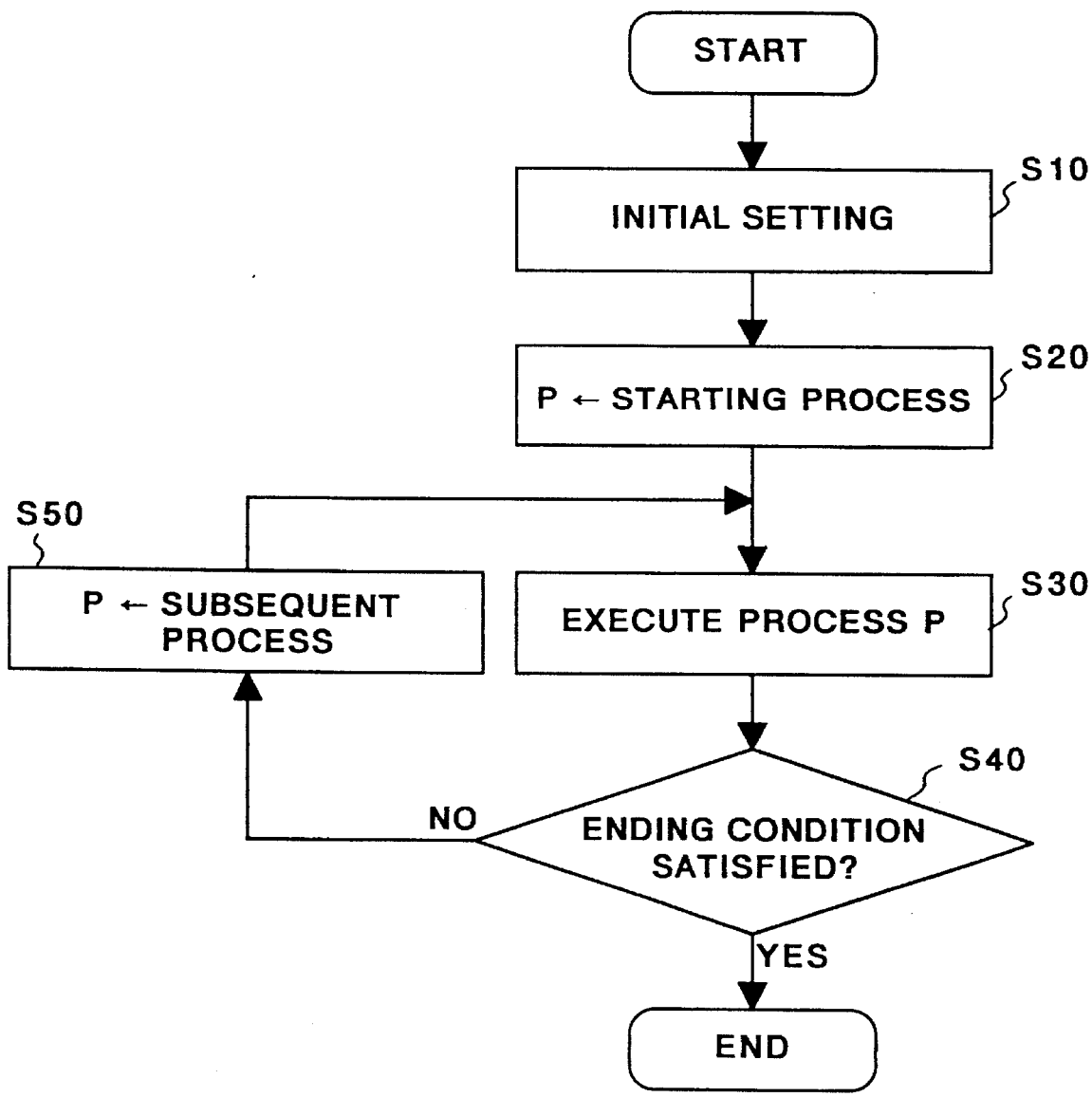
F I G. 2

42-3b

| OPERATION OF PRIMARY CHARGING |
|---|
| WHEN THE CHARGING CAPABILITY OF THE PRIMARY CHARGER IS NORMAL, THE CHARGING POTENTIAL OF THE DRUM IS (Vd, just). |
| WHEN THE CHARGING CAPABILITY OF THE PRIMARY CHARGER IS EXCESS, THE CHARGING POTENTIAL OF THE DRUM IS (Vd, over). |
| WHEN THE CHARGING CAPABILITY OF THE PRIMARY CHARGER IS SHORT, THE CHARGING POTENTIAL OF THE DRUM IS (Vd, under). |
| WHEN THE CHARGING CAPABILITY OF THE PRIMARY CHARGER IS 0, THE CHARGING POTENTIAL OF THE DRUM IS 0. |
| WHEN THE CHARGING UNIFORMITY OF THE PRIMARY CHARGER IS UNEVEN, THE CHARGING UNIFORMITY OF THE DRUM IS UNEVEN. |

FIG. 6

| CHARGING WIRE |
|---|
| IF THE DISCONNECTION IS EXISTING, THE CURRENT IS 0. |
| IF THE APPLIED VOLTAGE IS NORMAL, THE CURRENT IS NORMAL. |
| IF THE APPLIED VOLTAGE IS HIGH, THE CURRENT IS LARGE. |
| IF THE APPLIED VOLTAGE IS LOW, THE CURRENT IS SMALL. |
| IF THE APPLIED VOLTAGE IS 0, THE CURRENT IS 0. |
| -------------- |

F I G.   7

| CHARGER |
|---|
| IF THE CURRENT ON THE CHARGING WIRE IS NORMAL, THE CHARGING CAPABILITY IS NORMAL. |
| IF THE CURRENT ON THE CHARGING WIRE IS SMALL, THE CHARGING CAPABILITY IS SHORT. |
| IF THE CURRENT ON THE CHARGING WIRE IS 0, THE CHARGING CAPABILTY IS 0. |
| IF THERE IS A DISCONNECTION IN THE GRID, THE CHARGING CAPABILITY IS OVER. |
| IF THERE IS A SHORT-CIRCUIT IN THE GRID, THE CHARGING CAPABILITY IS 0. |
| - - - - - - - - - - - - - - |

FIG. 8

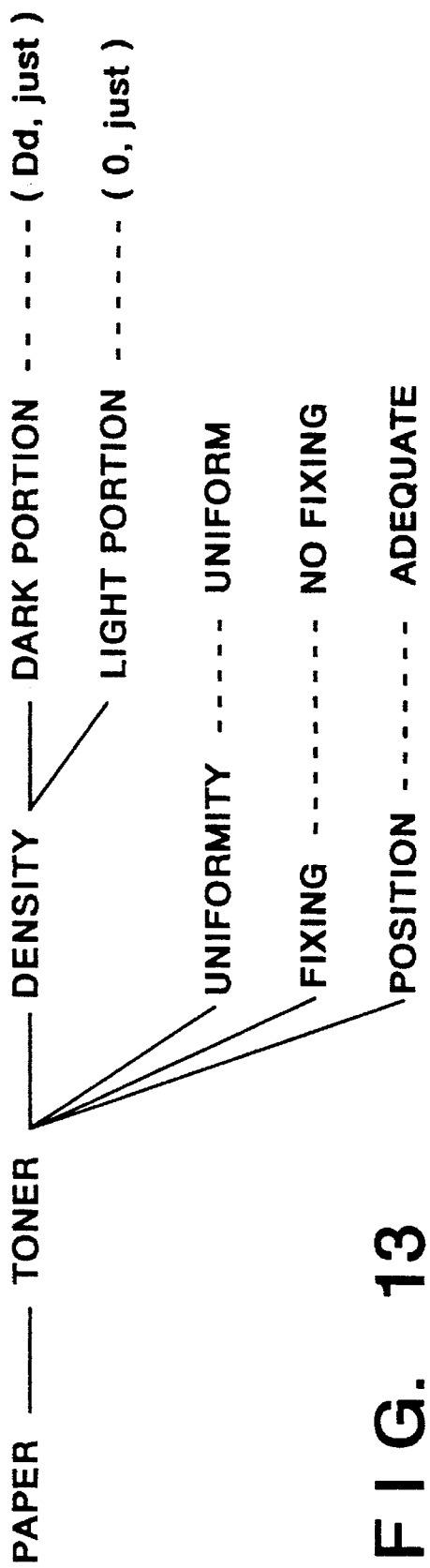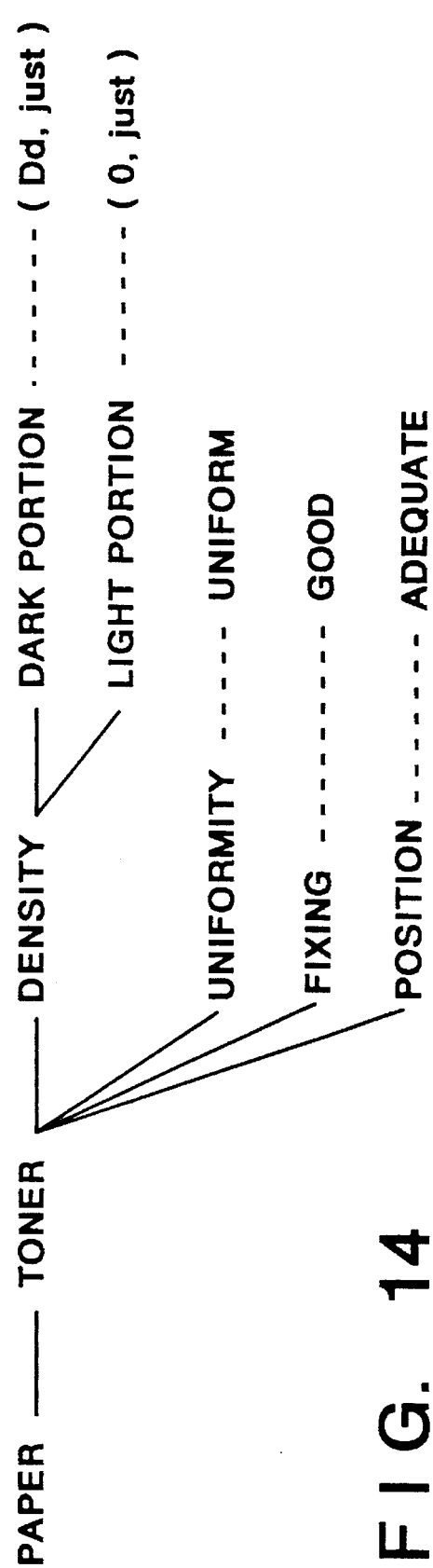
FIG. 13
FIG. 14

| | | |
|---|---|---|
| (1) | SYMPTOM | (SYMPTOM COPYING_PAPER_MEDIUM <OUTPUT IMAGE> FIXING_PROCESS NO_IMAGE_AT_ALL) |
| (2) | INSPECTION ITEM | CHECK ATTRIBUTE <DARK PORTION CHARGING POTENTIAL> OF THE DRUM IN THE PRIMARY CHARGING PROCESS |
| | | CHECK ATTRIBUTE <DARK PORTION TONER DENSITY> OF THE DRUM IN THE DEVELOPMENT PROCESS |
| | | CHECK ATTRIBUTE <DARK PORTION TONER DENSITY> OF THE COPYING PAPER IN THE TRANSFER/SEPARATION PROCESS |
| (3) | CAUSE CANDIDATE | ATTRIBUTE <DIRT> OF THE PRIMARY CHARGER IS MUCH IN THE PRIMARY CHARGING PROCESS |
| | | ATTRIBUTE <REFLECTED LIGHT FROM DARK PORTION> IS EXISTING IN THE EXPOSING PORTION IN THE IMAGE EXPOSURE PROCESS |
| (4) | RESULT OF INSPECTION | (RESULT_OF_INSPECTION PRIMARY_CHARGER <DIRT> PRIMARY_ CHARGING_PROCESS NON) |
| | | (RESULT_OF_INSPECTION DRUM <DARK_PORTION_CHARGING_ POTENTIAL> PRIMARY_CHARGING_PROCESS 0) |
| (5) | CAUSE CANDIDATE | ATTRIBUTE <CONNECTION> OF THE PRIMARY CHARGER IS FAILURE IN THE PRIMARY CHARGING PROCESS |
| (6) | RESULT OF INSPECTION | (RESULT_OF_INSPECTION PRIMARY_CHARGER <CONNECTION> PRIMARY_CHARGING_PROCESS NORMAL) |
| (7) | CAUSE CANDIDATE | ATTRIBUTE <DISCONNECTION> OF THE PRIMARY CHARGING WIRE IS EXISTING IN THE PRIMARY CHARGING PROCESS |

FIG. 18

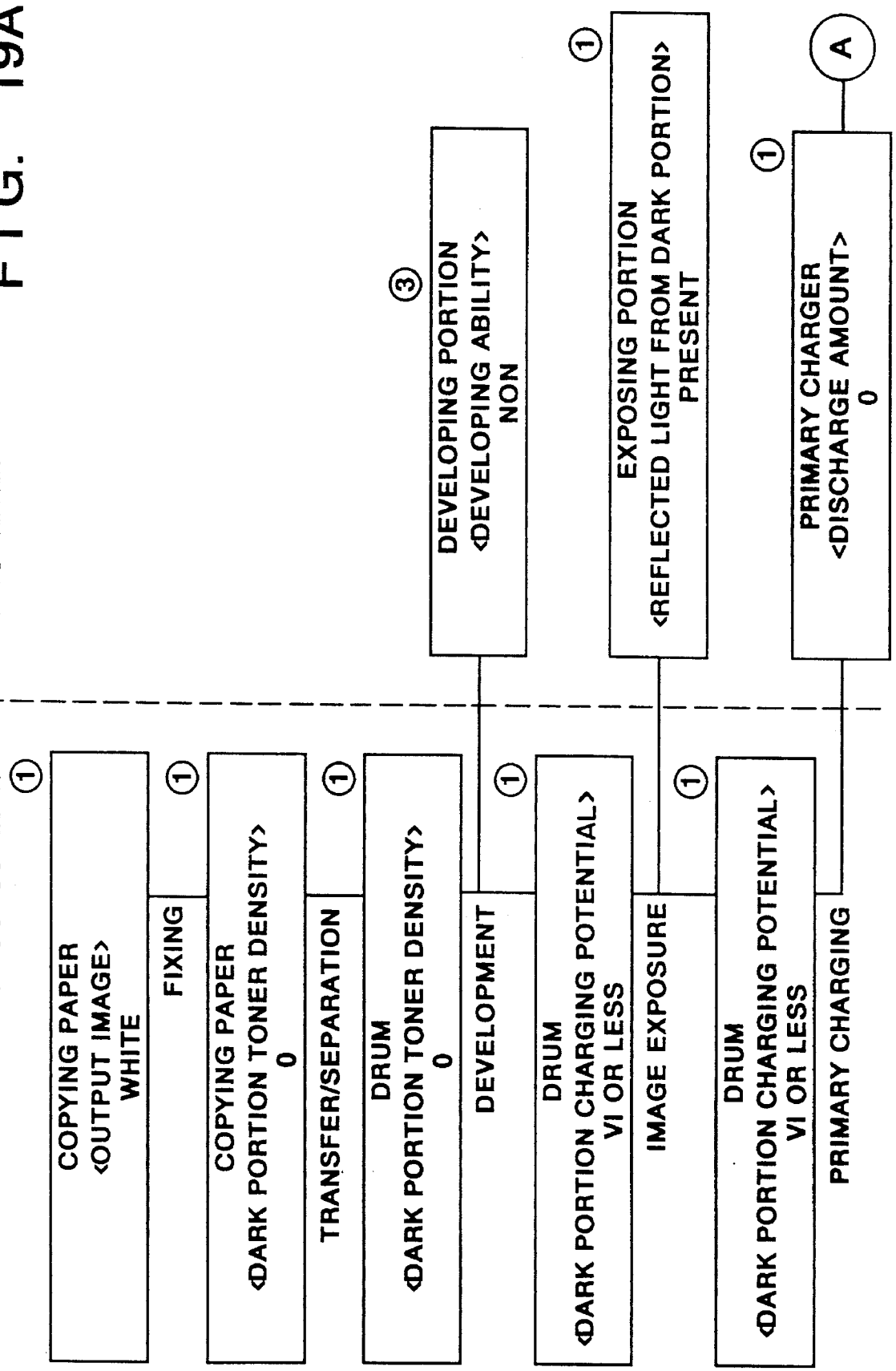

FAULT DIAGNOSIS USING SIMULATION

This application is a continuation of application Ser. No. 07/819,190 filed Jan. 10, 1992, now abandoned.

BACKGROUND OF THE INVENTION

The present invention generally relates to a simulation method, in particular, a fault diagnosis based on a model having a structure and an operation of an object apparatus.

Conventional model-based reasoning and fault diagnosis are executed on the basis of a model which describes a structure and operations of the parts of an apparatus which is an object of the reasoning and fault diagnosis as is described in "Randall Davis, Walter Hamscher, Model-based Reasoning: Troubleshooting, Exploring Artificial Intelligence, pp. 297–346 (1988)".

In such a model, the relationship of a normal value between input terminals Ail, ..., Aim of a part A and output terminals Aol, ..., Aon thereof in a normal condition is described as the operation of the part using a function FA, like "(Aol, ..., Aon)= FA (Ail, ..., Aim)" and the connective relationship between the output terminal Aox of the part A and the input terminal Biy of a part B is described as the structure of the apparatus using a predicate "connect" like "connect (Aox, Biy)".

In fault diagnosis, the cause of a fault is located using a symptom on the basis of the following criteria.

That is, if the value of the output terminal is abnormal, (1) either of the values of the input terminals is abnormal, or (2) the part has failed (alternatively, the operation model of the part is wrong).

However, in the aforementioned model, since each of the parts of the apparatus is defined as that having an independent operation, only a device, such as an electric circuit in which parts thereof are connected with each other via signal lines can be an object of inference or fault diagnosis.

SUMMARY OF THE INVENTION

An object of the present invention is to provide a simulation method and apparatus thereof capable of simulating an operation of a general apparatus, including an electric circuit, and fault diagnosis thereof by using a process model provided by expanding a conventional model having a structure of the apparatus and an operation of parts by addition of concepts of processes and media, as well as an apparatus for carrying out such a simulation method.

To achieve the aforementioned object, the present invention provides a simulation method comprising: parts data base means for holding data on the parts of an object to be simulated; and process model storage means for holding data on relationships between the parts in each of processes as well as data on relationships between an operation of each of the processes and attributes of media used in the object, whereby the simulation is performed using a model-based reasoning through the intermediary of the attributes of the media.

The present invention further provides a fault diagnosis apparatus which comprises a parts data base for storing data on an operation of each of the parts an object to be diagnosed, a process model storage means for storing a process model which describes cause-and-effect relationships between attributes of the parts and attributes of media of an operation of the object.

In the simulation method according to the present invention, influential relationship between the parts having no connection terminal, which could not be described in a conventional model having only a structure of the apparatus (connection relationships and parent-child relationships of the parts) and the operations of the parts, can be described as the operation of the apparatus using the processes and media. That is, the operation of the apparatus is expressed by the half-ordered processes and the media which carry out information transfer between the processes. Also, the interactions between the attributes of the media and the attributes of the components of the process can be described. Such interactions between the attributes include relationships having no special connection terminal. Hence, the media are parts which perform information transfer between the processes utilizing the interactions between the attributes thereof and the attributes of the components of each process. Portions of the parts thus have aspects of both parts and media.

The above and further objects, configurations and features of the invention will more fully appear from the following detailed description when the same is read in connection with the accompanying drawings.

BRIEF DESCRIPTION OF THE DRAWINGS

FIGS. 2 is a flowchart showing procedures for executing the simulation method according to the present invention;

FIG. 6 shows a rule table which describes the operation of primary charging;

FIG. 7 shows a rule table which describes the operation of a charging wire;

FIG. 8 shows a rule table which describes the operation of a charger;

FIGS. 9 through 14 respectively show the status of media obtained during simulation of normal operation when drum cleaning, primary charging, image exposure, development, transfer and fixing have been completed;

FIG. 18 shows an example of fault diagnosis; and

FIGS. 19A–19B show a developed example of a cause-and-effect tree.

DESCRIPTION OF THE PREFERRED EMBODIMENTS

Figure 1A:
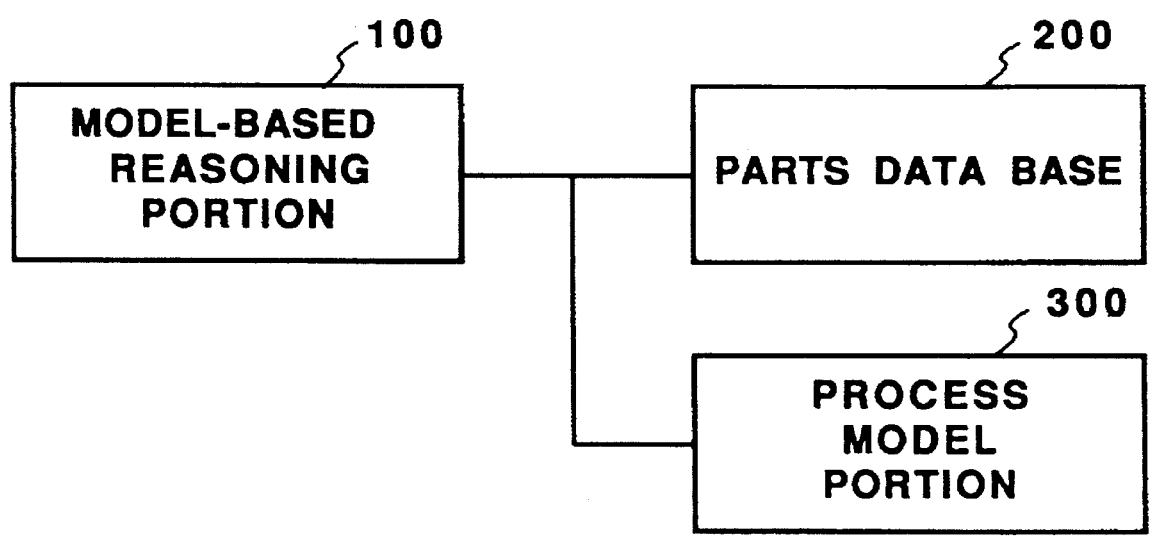
FIGS. 1A and 1B are block diagrams showing a structure for carrying out a simulation method according to the present invention.

In this invention, a process model made up of processes, media and parts is employed to describe an object apparatus to be diagnosed.

Process describes a function achieved by a group of components during a passage of time. There is an order in which the processes are executed. Each of the processes has internal statuses (including statuses of the components of the process and statuses of the process itself). The process achieves the function defined in that process with respect to statuses of media which are input and the internal statuses when the process is initiated, and determines statuses of media which are output and the internal statuses when the process is completed.

Process differs from part in that part actually has a corresponding part in the apparatus, while process has no actual corresponding part. Parts have a structure of a parent-child relationship. Although the relationship between a parent part and a child part and the relationship between a process and its components are alike, a part cannot be a child part of one part and that of another part at once while a certain part can be a component of a plurality of processes.

Media mediate an information transfer between the processes. Portions of parts have aspects of both media and parts.

Furthermore, the influential relationship between the components of a process can be described as the operation of the process. Such an influential relationship includes the relationship between the directly connected parts which is utilized in a conventional model and the relationship between the parts having no special connection terminal.

A relationship between the components of a process can be defined as a factor of the process and described in the operation of the process. That is, the relationship between the attributes of parts or media serving as both an input and output terminal in the conventional model is used to describe the operation of the process.

For example, when an attribute "Bay" of part B is decided from an attribute "A1ax1" of part A1, . . . , an attribute "Amaxm" of part Am, the operation rule of the attribute "Bay" is described by a function expressed by Bay= FBay (A1ax1, . . . , Amaxm).

Conventionally, only the relationships between the attributes of the same part are described in the operation. However, in the present invention, the influential relationships between the attributes of different parts can be described in the operation. Also, even when the attribute value is abnormal, the operation can be described as the cause-and-effect relationship.

In fault diagnosis carried out in the second embodiment of the present invention, the cause of a fault is located using a symptom on the basis of the following criteria. That is, when the value of the attribute "Bay" whose operation is described by Bay= FBay (A1ax1, . . . Amaxm) is e, which is different from its normal value, either of the following cases is considered:

(1) Aiaxi=ei (1≦ ∀i≦m) holds, where a set of (A1ax1, . . . , Amaxm) satisfying FBay (A1ax1, . . . , Amaxm)= e is expressed as (e1, . . . , em), or (2) The attribute "Bay" of part B is faulty (or the operation model of the attribute "Bay" is incomplete).

Figure 1B:
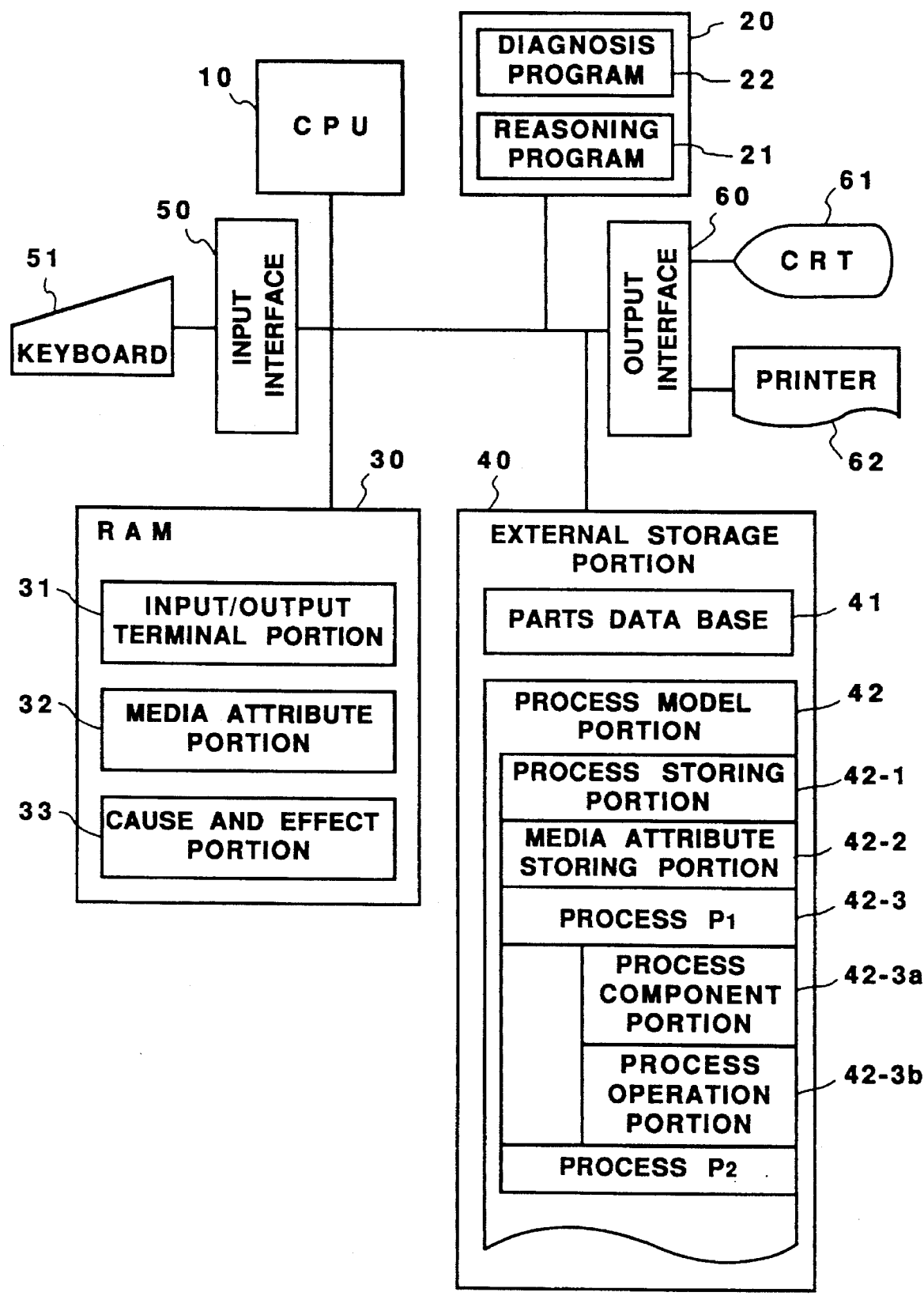

FIGS. 1A and 1B are block diagrams of a structure for carrying out a simulation method according to the present invention.

In FIG. 1A, a parts data base 200 stores the operational specification of basic parts. A process model portion 300 stores process model of an apparatus to be simulated, i.e., the structure of the apparatus and the specification of the processes. The relations between the input and output terminals are described as the operation of the parts in the parts data base 200. The influences between the parts generated by combining the parts are described in the process model portion 300. A model-based reasoning portion 100 performs simulation including fault diagnosis, by referring to the parts data base 200 and the process model portion 300.

In FIG. 1B, a CPU 10 performs arithmetic and control operations. A ROM 20 stores the operational programs of the CPU 10, including an inference program 21 and a diagnosis program 22. A RAM 30, serving as an auxiliary memory, has a media attribute portion 32 for storing the structure of the attributes of media and an cause-and-effect portion 33 used for fault diagnosis as well as a input/output terminal portion 31 for storing the conventional relations between the input and output terminals. An external memory 40 having a large capacity comprises a parts data base 41 for storing the operation specification and attributes of individual parts and a process model portion 42 for storing the relations between the parts, the order of processes, the basic configuration of the attributes of the media and so on. The aforementioned programs may be stored in the RAM 30.

The process model portion 42 includes a process storing portion 42-1 for storing the execution order of the processes, the process transition conditions and so on, a media attribute storing portion 42-2 for storing the attributes of the media, and processes 42-3. Each of the processes 42-3 consists of a process component portion 42-3a and a process operation portion 42-3b, stored as P1, P2, . . . Pn.

Example of Simulation

FIG. 2 is a flowchart showing the procedures for implementing a simulation method according to the present invention. First, in step S10, the simulation starting state, i.e., the initial state of the media and the factors of each process for the apparatus is set. Next, in step S20, the starting process is set. Thereafter, processes are sequentially executed by repeating the processes from step S30 to S50 until the ending conditions are satisfied. In step S30, the statuses of the output media are obtained from the statuses of the input media and the statuses of the process factors.

Simulation conducted on a copying machine will be explained in detail below as an example of the simulation method according to the present invention.

Figure 3:
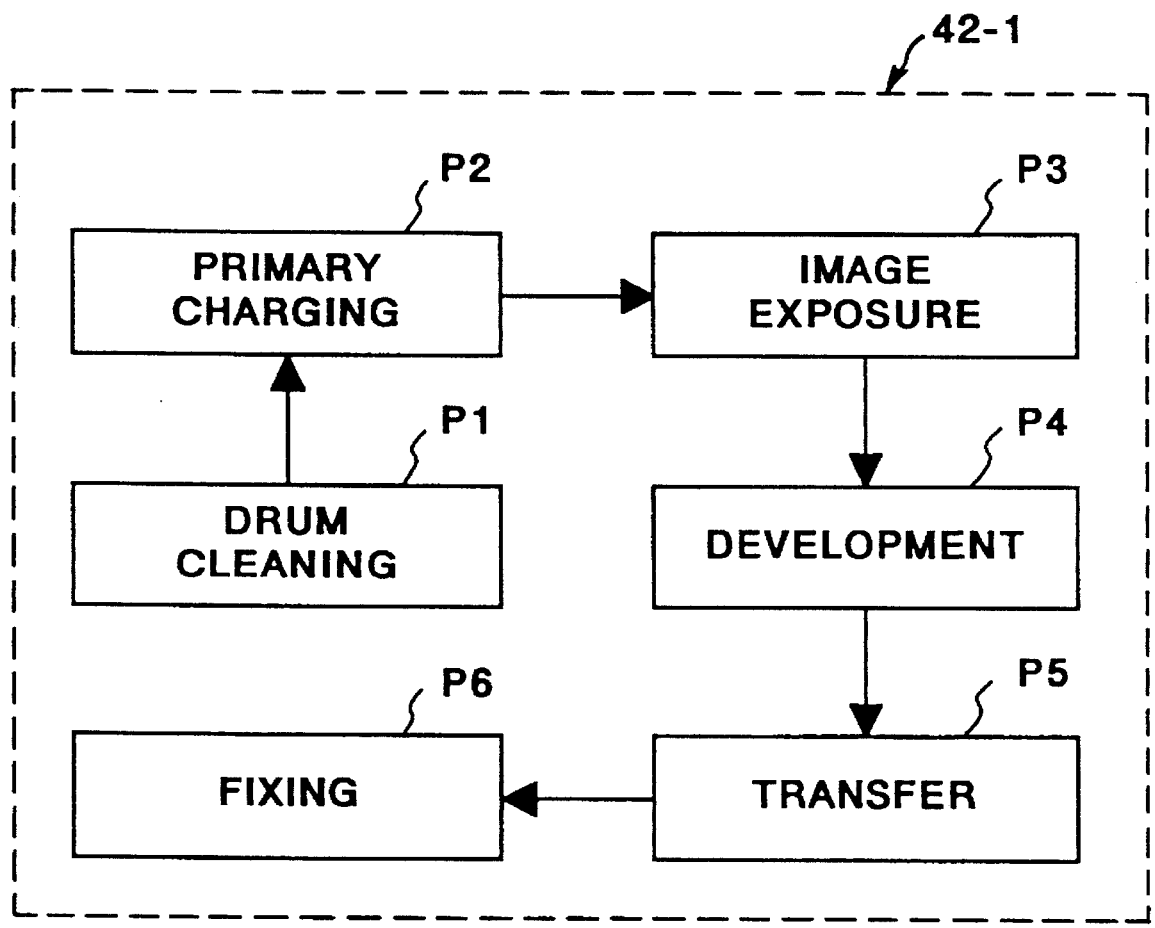
FIG. 3 shows an example of a process model of a copying machine.

FIG. 3 shows an example of the process model of the copying machine, such a process model is stored in the process storing portion 42-1. The process model includes six processes, drum cleaning (P1), primary charging (P2), image exposure (P3), development (P4), transfer (P5) and fixing (P6). Arrows indicated in FIG. 3 represent the execution order of the processes. The process storing portion 42-1 also stores the relations between the processes. The process transition conditions such as that primary charging is conducted after drum cleaning has been ended, or either drum cleaning or that fixing is executed after transfer has been completed are stored in the process storing portion 42-1.

Figure 4:
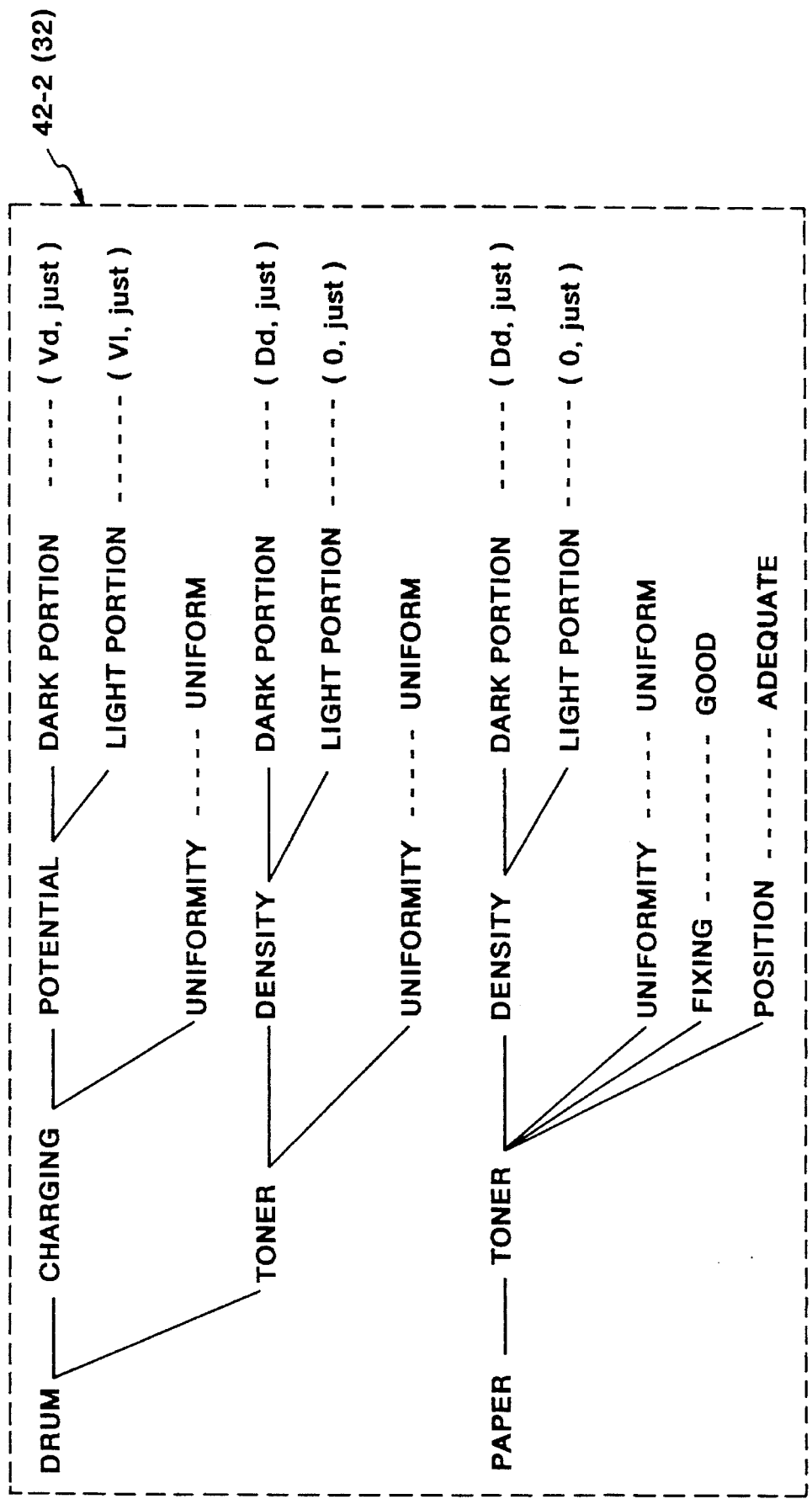
FIG. 4 illustrates a classification tree of attributes of media with status values of the results of simulation for a normal operation of a copying machine.

FIG. 4 illustrates a classification tree of the attributes of the media. The tree is read out e.g. from the media attribute storing portion 42-2 to the media attribute portion 32 and changes as the process proceeds. In this embodiment, a light-sensitive drum (hereinafter referred to as a drum) is a medium for drum cleaning, primary charging, image exposure, development and transfer, and a sheet of copying paper (hereinafter referred to as a sheet of paper) is a medium for transfer and fixing.

The drum has two attributes of charging for toner. The charging attribute is divided into two attributes of potential and uniformity. The potential attribute is classified into two portions of the drum corresponding to a dark portion (a black portion) and a light portion (a white portion) of an original. Each of the attributes at the end of the tree has its status value. FIG. 4 shows the status value of the results of a simulation in which the completion of fixing is regarded as a completion condition in a normal operation of the copying machine. For example, the status value of the dark portion of the charged potential of the drum is (Vd, just).

Vd and Vl respectively show the target potential of the dark and light portions. Dd indicates the standard toner density of the dark portion. (Vd, just) indicates that the status value is just equal to Vd. If the status value departs from Vd, e.g., if it surpasses Vd, "over" is used in place of "just". If the status value is less than Vd, "under" is used. The same rule applies to the attributes of the paper.

Primary charging process will be explained in detail below as the example of simulation of a process.

Figure 5:
FIG. 5 shows a list of components of primary charging.

FIG. 5 shows a list of components of primary charging. Such a list of components is stored in the component portion 42-3a of the process model portion 42 shown in FIG. 1 for each process. For each component of a process, an upper and child parts to which that part belongs are defined. The components of primary charging include a primary charger, a primary charging wire, a primary charging grid and so on. The upper part class of the primary charger is a charger, while the child parts thereof are the primary charging wire and the primary charging grid.

FIG. 6 shows a rule table which describes the operation of primary charging. Such a rule table which describes the interactions between the attributes, e.g., the interactions between the attributes of the component and the attributes of the media, is stored in the operation portion 42-3b of the process model 42 shown in FIG. 1 for each process.

FIGS. 7 and 8 respectively show a rule table which describes the operation of the charging wire and of the charger. Such a rule table which describes the interactions between the attributes, including the interaction between one attribute and another attribute of a part or the interaction between the attribute of a part and the attribute of a child part thereof, is stored in the parts data base 41 shown in FIG. 1 for each of the basic parts.

Using these rule tables, the attributes of the media of the primary charging process are determined. In an initial state of the copying machine whose operation is normal, there is no disconnection of the primary charging wire, voltage applied to the primary charging wire is normal, and there is neither disconnection nor short-circuit of the primary charging grid.

Using the knowledge indicated in FIG. 5 that the primary charging wire is one of charging wire and an operation rule of the charging wire indicated in FIG. 7, a fact that a current of the primary charging wire is normal is obtained. That is, since the primary charging wire succeeds the operation of charging wire which is the upper part class of the primary charging wire, the primary charging wire has the same operation as the charging wire. Since there is no disconnection in the primary charging wire in the initial state the rule, "if the disconnection is existing, current is 0" is not satisfied. Since the applied voltage to the primary charging wire is normal, the rule, "if the applied voltage is normal, the current is normal" is satisfied, and that the current of the primary charging wire is normal is determined.

Next, using the knowledges indicated in FIG. 5 that the primary charger is one of chargers and that the child parts of the primary charger are the primary charging wire and the primary charging grid, and the operation rule of the charger indicated in FIG. 8, that the charging capability of the primary charger is normal is determined. That is, since the primary charger succeeds the operation of the charger which is the upper part class of the primary charger, the primary charger has the same operation as the charger. Using the knowledge that the child parts of the primary charger are the primary charging wire and the primary charging grid, the knowledge indicated in FIG. 5 that the primary charging wire is one of the charging wires, and the knowledge indicated in FIG. 5 that the primary charging grid is one of the grids, the primary charger has an operation rule which is created by using the operation rules indicated in FIG. 8 and by respectively replacing the charging wire and grid in the rules in FIG. 8 with the primary charging wire and primary charging grid.

More specifically, since the operation rule of the charger, "if the current of the charging wire is normal, the charging capability is normal" has been replaced by the operation rule of the primary charger, i.e. "if the current of the primary charging wire is normal, the charging capability is normal". A fact that the current of the primary charging wire is normal has thus already been obtained, that the charging capability of the primary charger is normal is determined. Although there exist the rules of the primary charger obtained from the rules of the charger, "if there is a disconnection of the primary charging grid, charging capability is over" and "if there is a short-circuit of the primary charging grid, charging capability is 0", since it has been initially set that there is neither disconnection nor short-circuit of the primary grid, neither of the conditions is satisfied, and the charging capability of the primary charger becomes normal.

Finally, using the operation of primary charging indicated in FIG. 6, an attribute that the charging potential of the drum is (Vd, just) is obtained. That is, the rule, "if the charging capability of the primary charger is normal, the charging potential of the drum is (Vd, just)" is satisfied, and the charging potential of the drum thus is (Vd, just).

Simulation of the normal operation of the copying machine will be explained below with reference to FIGS. 9 through 14 which respectively show the statuses of media on the basis of the aforementioned example of the simulation of the primary charging process. In the following explanation of simulation, a detailed description of the rule tables is omitted.

First, initial setting indicated by step S10 of the flowchart shown in FIG. 2 is performed. The statuses of the media and those of the factors of each processes are set as normal values, and drum cleaning (P1) is set as the starting process while completion of fixing process (P6) is set as the completion condition.

Figure 9:
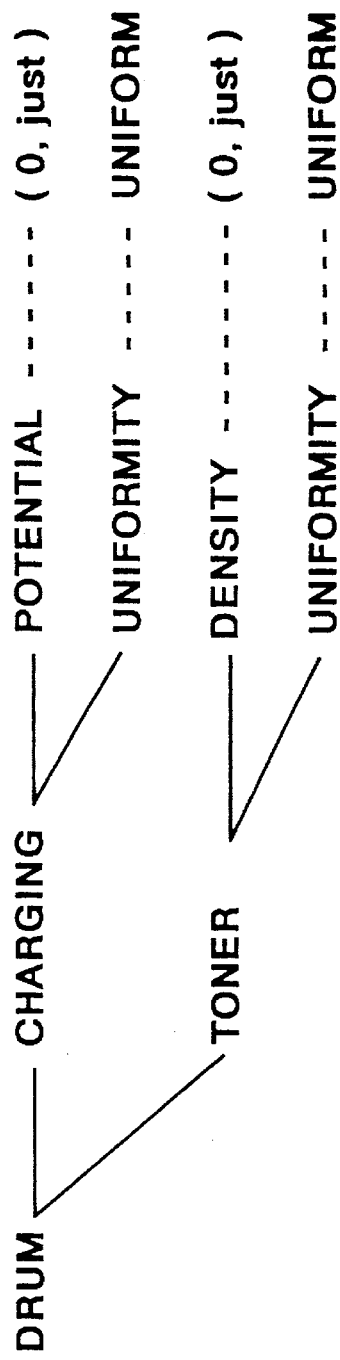

After drum cleaning (P1) has been executed, the status of the medium is, that the drum is uniformly charged to 0 and the density of the toner is uniformly 0 as indicated in FIG. 9. Although the attributes of the charging potential and the toner density are divided for the dark and light portions in FIG. 4, the dark and light portions are treated as one status, since the status value of the dark and light portions is the same. Since the completion condition is not yet satisfied, primary charging (P2) is assigned to 0 as a subsequent process. Thereafter, the primary charging process and others are executed in order similarly.

Figure 10:
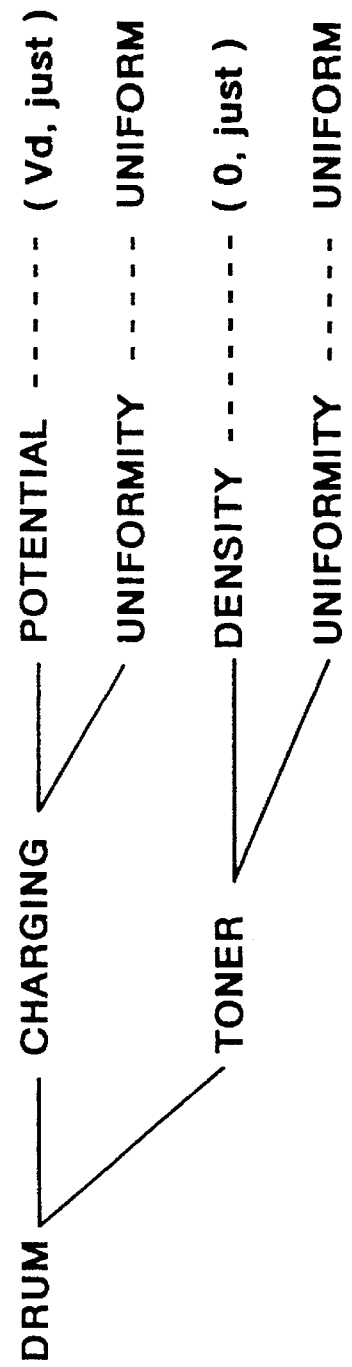
Figure 11:
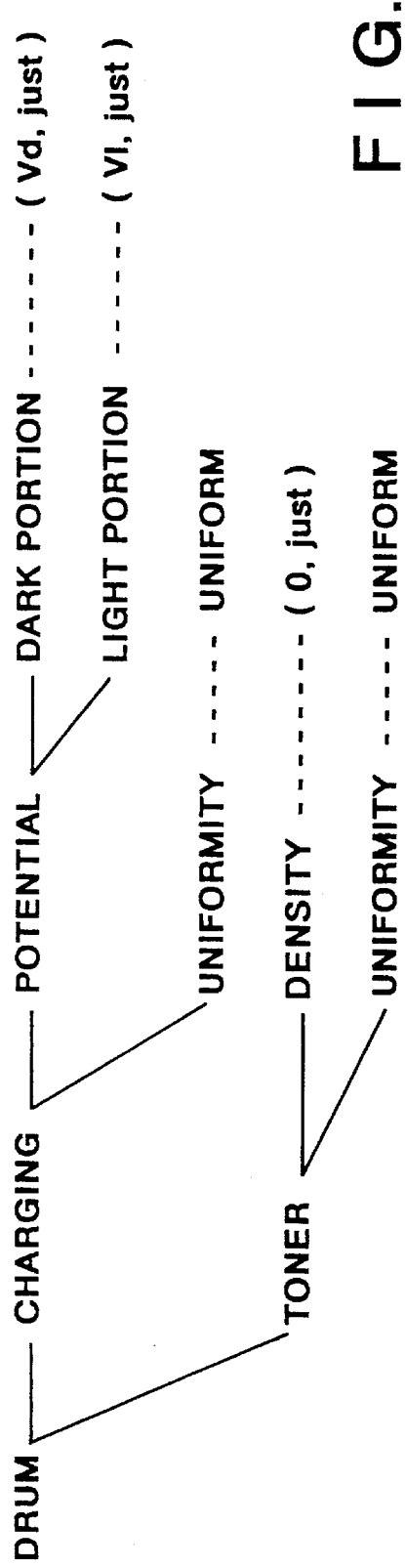
Figure 12:
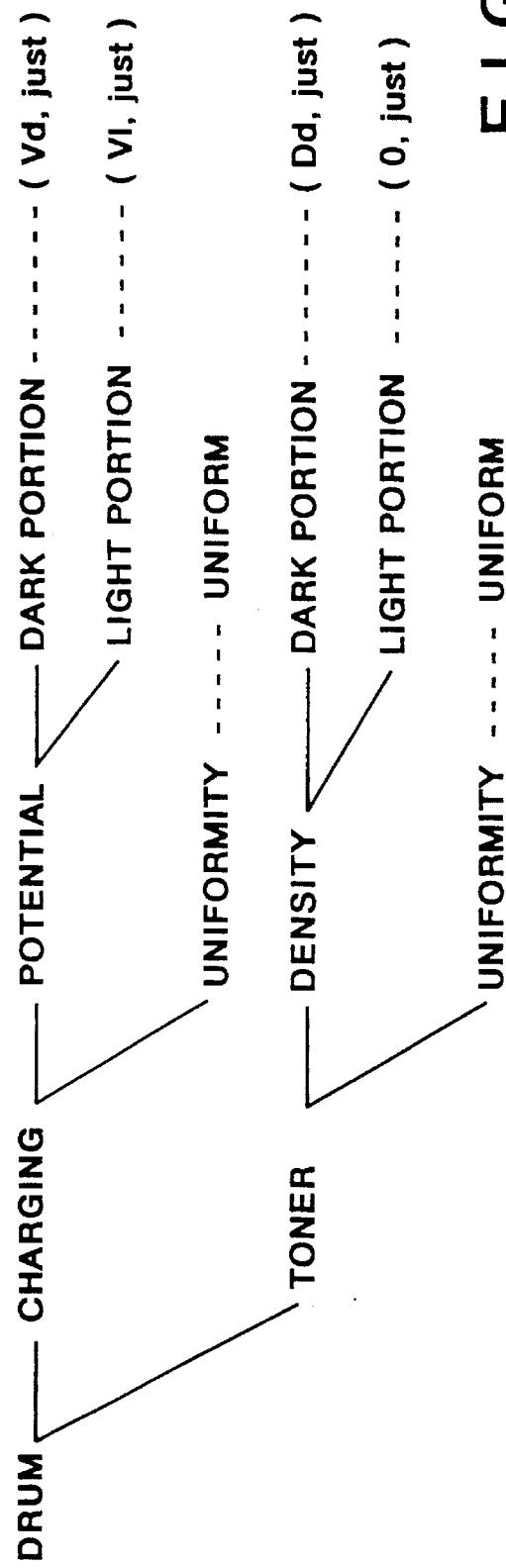

FIG. 10 shows a state in which the drum is uniformly charged to Vd, and there is no change in the density of the toner when primary charging has been completed. FIG. 11 shows the state obtained when image exposure has been completed. Except for that the potential of the drum is divided for the light and dark portions, the figure shows that the potential of the light portion is lowered to Vl, the drum is uniformly charged, and that there is no change in the density of the toner. FIG. 12 shows the state obtained when development has been completed. The figure shows that the toner density is Dd for the dark portion whose potential is Vd.

FIG. 13 shows the state in which the toner density and uniformity of the drum has been transferred to toner density and uniformity of the paper without change when transfer has been completed. It also show that the position is adequate, and that fixing has not been completed. FIG. 14 shows the state in which the fixing is good when fixing has been completed. When the fixing is completed, the completion condition of the simulation is satisfied, thus the simulation ends.

Conventionally, only the operation of each part and the connection between the parts could be described as a model of an object to be simulated. However, in the present invention, since influential relationship between the parts generated by combining the parts can be described using process model, model-based simulation can be applied to wider variety of apparatuses.

More specifically, the operation of the apparatus is expressed by the orderly processes and the media which carry out information transfer between the processes. Also, the interactions between the attributes of the media and the attributes of the components of the process can be described. Such interactions between the attributes include relationships having no special connection terminal. Hence, the media are parts which perform information transfer between the processes utilizing the interactions between the attributes thereof and the attributes of the components of each process. Some of the parts thus have aspects of both parts and media.

Example of Fault Diagnosis

An example of the simulation method according to the present invention which is expanded to fault diagnosis will be described below.

Figure 15:
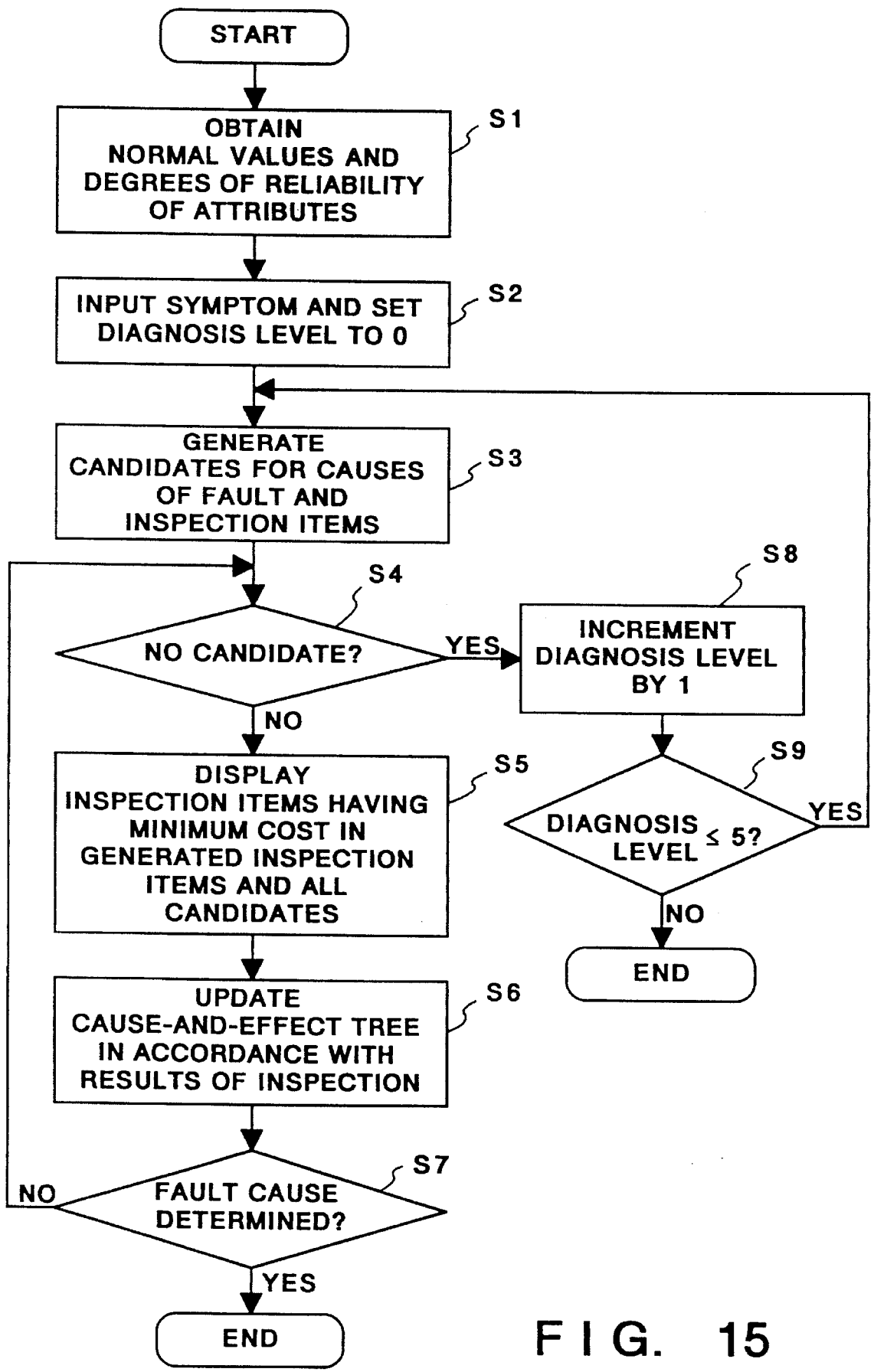
FIG. 15 is a flowchart showing the procedure of a fault diagnosis according to the present invention.

FIG. 15 is a flowchart of the fault diagnosis method.

Fault diagnosis is considered as development of a cause-and-effect tree whose roots indicate symptoms. This tree branches out from effect to cause which is achieved by following operation rules (cause-and-effect relationships between attributes) described in a model in the reverse direction. First, candidates for the causes of the fault that can account for the symptoms are generated. These candidates are narrowed down by inspections to determine the cause of the fault.

In a desirable diagnosis method, candidates for strong possibility for the causes of the fault are generated first, and then these candidates can be narrowed down quickly by efficient inspections. Hence, the following two evaluation criteria are defined.

Reliability of parts

Reliability of parts determined by design and manufacture is expressed by numerical values (5 through 1). A lower numeral value indicates a part which readily becomes faulty. The usage data on individual apparatuses is determined in the same way. A degree of reliability of the part which has been used longer than its guaranteed period of durability is made 0.

Inspection cost

Sub-concepts defined by cost for each of inspection items are added as e.g. "check" "measurement" "replacement" and "difficulty". Further, these sub-concepts are in ascending order of cost. In some apparatuses, expense required to conduct an inspection may be adopted as "cost".

Procedures of the fault diagnosis method will be described below with reference to the flowchart of FIG. 15.

First, in step S1, the aforementioned simulation of a normal operation is conducted to obtain the normal values of the attributes of media/parts and degrees of reliability thereof.

Next, in step S2, a symptom of the fault is input, and 0 is set as a diagnosis level. In step S3, the cause-and-effect tree is expanded using the symptom to determine the cause. At that time, candidates for the causes of the fault and inspection items are generated only from the attributes having a degree of reliability equal to the diagnosis level.

In step S4, it is determined whether or not there are candidates for the causes of a fault. If there is no candidate, the process goes to step S8 and the diagnosis level is incremented to 1. In step S9, it is determined whether the diagnosis level is equal to or lower than 5. If the diagnosis level is equal to or lower than 5, the process returns to step S3. If the diagnosis level is higher than 5, the diagnosis operation fails, and is thus completed.

If it is determined in step S4 that there are candidates for the causes of the fault the process goes to step S5. Low cost inspection items out of the generated inspection items and all the generated candidates for the causes of the fault are displayed in step S5.

Thereafter, the user executes the displayed inspection items and inputs the results of the inspection items in step S6 to update the cause-and-effect tree in accordance with the input results of the inspections. In step S7, it is determined whether or not the cause of the fault has been specified. If the cause of the fault has been specified, the process is completed. If the cause of the fault has not been specified, the process returns to step S4.

An example of the aforementioned fault diagnosis which is applied to the copying machine will be explained below.

The process model, the lists of components and the rule tables employed in this example are identical to those shown in FIGS. 3 and 5 through 8.

Figure 16:
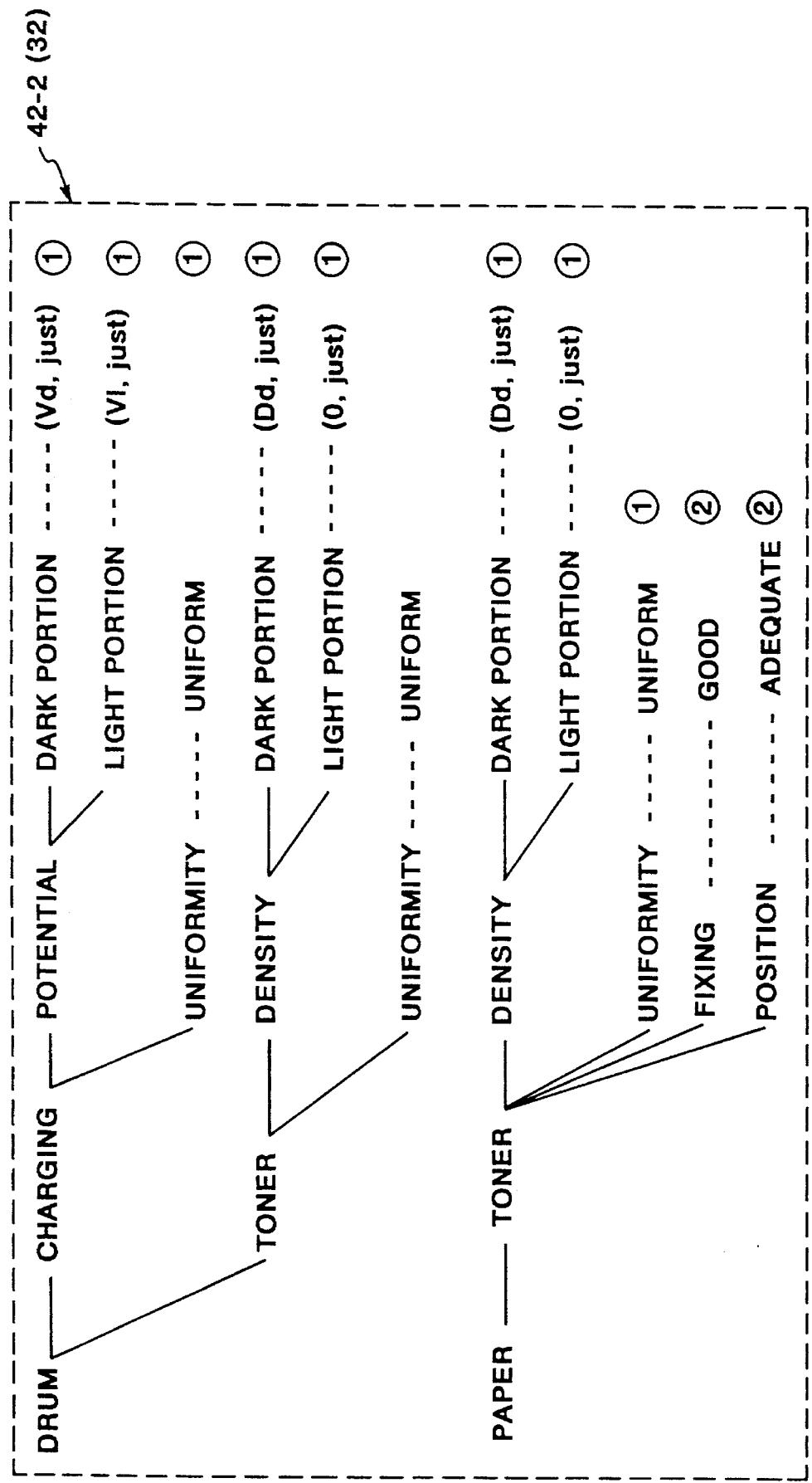
FIG. 16 shows the attributes of the media.

FIG. 16 illustrates a classification tree of the attributes of a drum and paper which are the media of processes used in this fault diagnosis.

The drum has two attributes of charging and toner. The charging attribute is classified into potential and uniformity. The potential attribute is further classified into two portions of an original paper which correspond to a black portion and a white portion. Each of the attributes at the end has its status value. In the example shown in FIG. 16, the charged potential of the dark portion is (Vd, just).

Vd and Vl respectively indicate the target potential of the dark and light portions. Dd indicates the standard toner density of the dark portion. (Vd, just) indicates that the status value is just Vd. If the status value departs from Vd, e.g., if it surpasses Vd, "over" is used in place of "just". If the status value is less than Vd, "under" is used. In this example, the circled digits are affixed to indicate a degree of reliability indicating that the attribute is normal.

Figure 17:
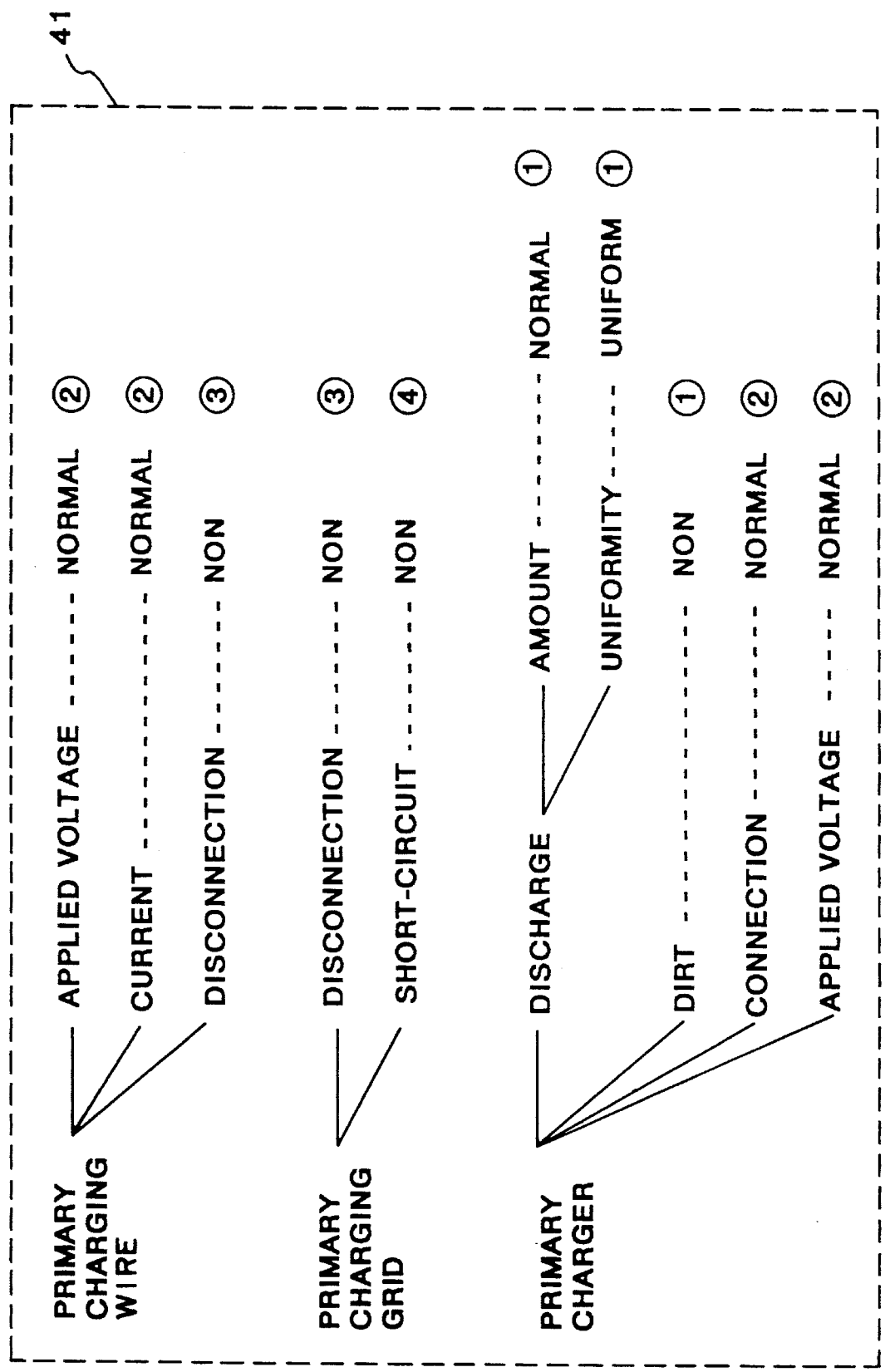
FIG. 17 shows the attributes of the parts.

FIG. 17 illustrates a classification tree of the attributes of the components of the primary charging process which is stored in the parts data base 41.

The primary charging wire has attributes of applied voltage, current and disconnection. The primary charging grid has attributes of disconnection and short-circuit. The primary charger has attributes of discharge, dirt, connection and applied voltage. The discharge attribute is divided into two attributes of amount and uniformity. The circled digits indicate a degree of reliability indicating that the attribute is normal, as in the case shown in FIG. 16.

In this example, the cause of the fault is inferred by exploring the rule tables shown in FIGS. 6 through 8 in a reverse direction.

Figure 19B:
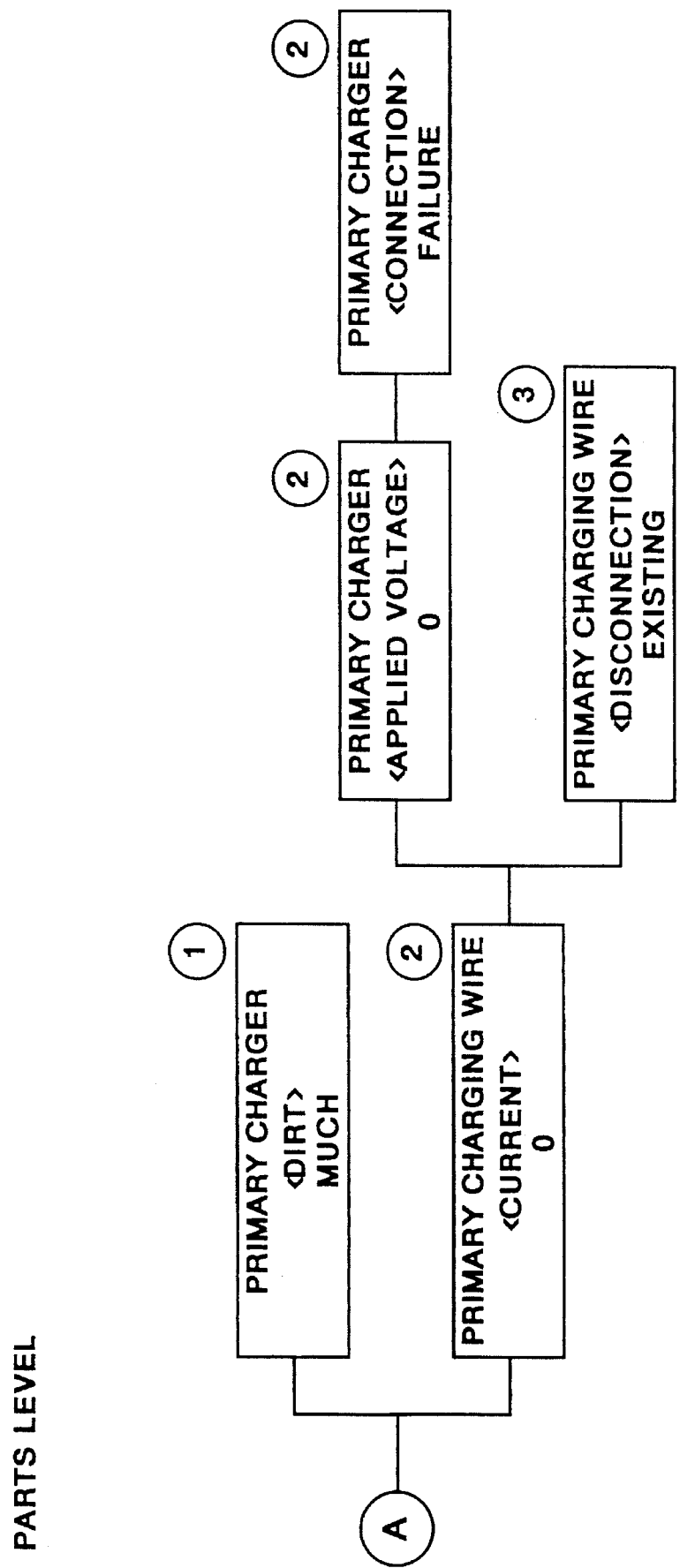

FIG. 18 shows an example of fault diagnosis executed when a symptom, "the output image is noimageatall" is provided. FIG. 19 illustrates an example of development of the cause-and-effect tree which is created in the cause-and-effect portion 33. In FIG. 19, the candidates for the causes of the fault up to diagnosis level 3 are developed on the basis of a symptom that the copy which has been subjected up to the fixing process has no image at all. In the process level, the tree branches out downward, while in the parts level, the tree branches out to the left. The circled numeral put on the left side of and above each box indicating the attribute value indicates a degree of reliability that that attribute is normal.

The example of the fault diagnosis shown in FIG. 18 will be explained in detail with reference to the flowchart of FIG. 15.

First, "output image is noimageatall" is input as the symptom (1) (step S2). Since there is no parts having a degree of reliability 0 (parts which have been used longer than their guaranteed period of durability), there is no fault causing candidate at diagnosis level 0. After the diagnosis level is incremented to 1 (steps S2 to S4 and S8 and S9), the cause-and-effect tree of the attributes which satisfy the input symptom and which have a degree of reliability 1 are developed to generate inspection items (2) and cause candidates (3). Thereafter, the inspection items requiring the minimum cost and all the cause candidates are displayed (steps S3 to 5).

When the results of the inspections (4) are input, the cause-and-effect tree is updated on the basis of the results of the inspections (step S6). When the candidates for the causes of the fault having a degree of reliability 1 are deleted, candidates for the causes of the fault having a degree of reliability 2 are generated as the cause candidates (5) and displayed (steps S7, S4, S8 and 9, S3 to S5).

When the results of another inspections (6) are input, the cause-and-effect tree is updated on the basis of the input results of the inspections (step S6). When the candidates for the causes of the fault having a degree of reliability 2 are deleted, candidates for the causes of the fault having a degree of reliability 3 are generated as the cause candidates (7) and displayed (steps S7, S4, S8 and 9 and S3 to S5).

In the diagnosis executed in the manner described above, if the cause of the fault is determined by the inspections, the diagnosis was a successful. If the cause of the fault cannot be determined, the diagnosis was unsuccessful.

Fault diagnosis according to the present embodiment has the following advantages.

(1) Efficient diagnosis can be performed by using two criteria, reliability of the parts and the inspection cost. That is, the candidates for the causes of the fault are generated in accordance with the ascending order of the reliability of the parts. Further, the diagnosis can alleviate the user's cognitive load by displaying only the inspections having a low cost.

(2) Since diagnosis can also proceed with execution of the inspection being withheld, operability is improved.

(3) Even if it fails to determine the cause of the fault, the range where the cause of the fault exists or incomplete portion of the model can be obtained.

Other Examples of Diagnosis

In the aforementioned example of diagnosis, development of the cause-and-effect tree shown in FIG. 19 has been used only for explanation of the example. However, another example to display the developed portion of the cause-and-effect tree during fault diagnosis, as well as the candidates for the causes of the fault and inspection items may be possible.

In the above example, (1) the explored cause-and-effect tree can be used to illustrate why a symptom is generated from the candidates for the causes of the fault. (2) It is possible for the user to estimate and confirm from the inspection items how the candidates are narrowed down. Consequently, the user can be assured of the credibility of the diagnosis.

Furthermore, selection of the inspection item may be made more easily by designating a node of the displayed cause-and-effect tree which corresponds to an inspection item to be selected, e.g. by clicking a mouse. In the aforementioned example, the cause-and-effect tree has been developed in steps by the diagnostic level. However, the entire tree may be developed in one display operation (that is, the tree illustrated in FIG. 19 may be used).

In another example of diagnosis, input of the symptoms or the results of an inspection may be made visually not by using characters or symbols but by displaying, for example, images on a screen and then selecting one of them. In that case, input of symptoms can be facilitated.

As will be understood from the foregoing description, in the conventional model-based fault diagnosis only the operation of the parts and the relations between the parts can be described as the model of an apparatus to be diagnosed. However, in the present invention, since the influential relationships between the parts generated by combination of the parts can be described using the process model, fault diagnosis can be performed on a wider variety of apparatuses.

Furthermore, in the conventional fault diagnosis, to obtain the abnormal value of an input terminal of a part, an assumption that only one terminal is abnormal and that all other terminals are normal must be made, that is, a single fault must be assumed, and diagnosis of compound faults in which anomaly occurs in a plurality of terminals cannot be conducted. In the present invention, since the cause-and-effect relationships between the attributes can be described in the operation, diagnosis on compound faults can also be conducted.

It will be obvious to those skilled in the art that various changes, modifications and addition of the aforementioned preferred embodiments may be made in the invention without departing from the spirit and scope of the appended claims and therefore intended to embraced by the claims.

What is claimed is:

1. A simulation method for simulating operations of a plurality of processes sequentially executed in an object, said method comprising the steps of:

holding rules for first interactions between an attribute of a part and another attribute of the part or an attribute of a child part of the part according to each part of the object, in a part data base;

holding an execution order for the plurality of processes, a knowledge of relationships between a part used in each process and another part, and rules for second interactions between attributes of a medium and a part used in the operation in each process as a process model in a process model memory; and performing a simulation of the operations by determining statuses of attributes of parts and media after each of the processes, sequentially in the execution order held in the process model memory, using a model-based reasoning by referring to the first and second interactions, the knowledge of the relationship between the part used in each process and the another part and statuses of attributes of the parts and the media determined in a preceding process.

2. A simulation method according to claim 1, wherein the attributes of the medium are expressed in a tree structure and are updated in accordance with both the data on the process and the data on the parts.

3. A fault diagnosis method for detecting a cause of the fault occurring in an object executing a plurality of processes comprising the steps of:

holding rules for first interactions between an attribute of a part and another attribute of the part or an attribute of a child part of the part according to each part of the object, in a part data base;

holding an execution order for the plurality of processes, a knowledge of a relationship between a part used in each process and another part, and rules for second interactions between attributes of a medium and a part used in the operation in each process as a process model in a process model memory; and performing the fault diagnosis by determining fault statuses of attributes of parts and media after each of the processes, said fault statuses being candidates for causes of effecting statuses of attributes corresponding to the fault in a following process, sequentially in reverse order of the execution order held in the process model memory, using model-based reasoning by referring to the first and the second interaction relationships, the knowledge of the relationship between the part used in each process and the another part and statuses of attributes of the parts and the media determined in the following process.

4. A fault diagnosis method according to claim 3, wherein the fault diagnosis is executed using a tree which expresses relationships between causes and effects of faults and which has been created on a basis of both the attributes of the parts and the attributes of the media.

5. A fault diagnosis method according to claim 4, wherein both the attributes of the parts and the attributes of the media are expressed in a tree structure, each of the attributes having a degree of reliability indicating that each part is normal.

6. A fault diagnosis method according to claim 5, wherein a plurality of diagnosis levels are provided by a degree of reliability of each of the attributes which indicates that the attribute is normal.

7. A fault diagnosis apparatus for diagnosing a fault occurring in an object comprising:

parts data base means for storing rules for first interactions between an attribute of a part and another attribute of the part or an attribute of a child part of the part according to each part of the object, in a part data base;

process model storage means for storing an execution order for the plurality of processes, a knowledge of a relationship between a part used in each process and the another part, and rules for second interactions between attributes of a medium and a part used in the operation in each process as a process model; and diagnosis means for performing the fault diagnosis by determining fault statuses of attributes of parts and media after each of the processes, said fault statuses being candidates for causes of effecting statuses of attributes corresponding to the fault in a following process, sequentially in an order reverse to the execution order in the process model memory using a model-based reasoning by referring to the first and second interaction relationships, the knowledge of the relationship between the part used in each process and the another part and the statuses of attributes of the parts and the media determined in the following process.

8. A fault diagnosis apparatus for diagnosing a fault occurring in an object comprising:

parts data base means for storing rules for first interactions of parts of an object to be diagnosed in a form of relationships between attributes of the parts in a part data base;

process model storage means for storing knowledge of relationships between parts used in each of processes of the object and for storing rules for second interactions between an attribute of each of the parts and an attribute of a medium in an operation of each of the processes; and diagnosis means for performing the fault diagnosis by using a model based reasoning by referring to the first and second interactions, to the knowledge of the relationship between the part used in each process and the another part and to inference relationships between attributes of parts not stored in said parts data base means nor stored in said process model storage means, said inference relationships being inferred through the second interactions between attributes of a medium and attributes of a part stored in the process model storage means, said diagnosis means having a tree which expresses relationships between causes and effects of faults which has been created on the basis of both the attributes of the parts and the attributes of the media and which is updated by results of an inspection.

9. A fault diagnosis apparatus for diagnosing a fault occurring in an object comprising:

parts data base means for storing rules for first interactions of parts of an object to be diagnosed in a form of relationships between attributes of the parts in a part data base;

process model storage means for storing knowledge of relationships between parts used in each of processes of the object and for storing rules for second interactions between an attribute of each of the parts and an attribute of a medium in an operation of each of the processes; and diagnosis means for performing the fault diagnosis by using a model based reasoning by referring to the first and second interactions, to the knowledge of the relationship between the part used in each process and the another part and to inference relationships between attributes of parts not stored in said parts data base means nor stored in said process model storage means, said inference relationships being inferred through the second interactions between attributes of a medium and attributes of a part stored in the process model storage means, said diagnosis means having a tree which expresses relationships between causes and effects of faults which has been created on the basis of both the attributes of the parts and the attributes of the medium and which is updated by results of an inspection, wherein both the attributes of the parts and the attributes of the media are expressed in a tree structure in which each of the attributes has a degree of reliability indicating that they are normal, and wherein said diagnosis means has level selection means for making a selection of diagnosis level in accordance with the degree of reliability.

10. A fault diagnosis method for detecting a cause of the fault occurring in an object executing a plurality of processes comprising the steps of:

storing first interactions of each of parts of an object to be diagnosed in a form of relationships between attributes of the parts;

storing data on relationships between parts used in each of processes of the object and for storing data on a cause-and-effect relationship between an attribute of one of the parts and an attribute of a medium in an operation of each of the processes; and performing the fault diagnosis by using a model-based reasoning by referring to said stored data on the operation and the relationships and by referring to inference relationships between attributes of parts not stored, said inference relationships being inferred through the second interactions between attributes of a medium and attributes of part stored, said stored data having a tree which expresses relationships between causes and effects of faults which has been created on the basis of both the attributes of the parts and the attributes of the medium and which is updated by results of an inspection.

11. A fault diagnosis method for detecting a cause of the fault occurring in an object executing a plurality of processes comprising the steps of:

storing rules for first interactions of parts of an object to be diagnosed in a form of relationships between attributes of the parts in a part data base;

storing knowledge of relationships between parts used in each of processes of the object and for storing rules for second interactions between an attribute of each of the parts and an attribute of a medium in an operation of each of the processes; and performing the fault diagnosis by using a model-based reasoning by referring to the first and second interactions and to inference relationships between attributes of parts data on which is not stored, said inference relationships being inferred through the second interactions between attributes of a medium and attributes of part stored, said stored rules having a tree which expresses relationships between causes and effects of faults which has been created on the basis of both the attributes of the parts and the attributes of the media and which is updated by results of an inspection, storing data on an operation and attributes of each of the parts of an object to be diagnosed;

wherein both the attributes of the parts and the attributes of the media are expressed in tree structure in which each of the attributes has a degree of reliability indicating that they are normal, and further making a selection of a diagnosis level in accordance with the degree of reliability.

* * * * *

UNITED STATES PATENT AND TRADEMARK OFFICE
CERTIFICATE OF CORRECTION

PATENT NO. : 5,528,752

DATED : June 18, 1996

INVENTORS : TAKASHI KISE ET AL.

It is certified that error appears in the above-identified patent and that said Letters Patent is hereby corrected as shown below:

ON THE COVER PAGE ITEM

[56] References Cited - Other Publications

Column 2, line 3, "form" should read --from--.
Column 3, line 4, "Artiicial" should read --Artificial--.

COLUMN 1

Line 22, "(Ail,..., Aim)"and" should read
         --(Ail,..., Aim)", and--;
Line 26, "connect" should read --connect,--.
Line 63, "parts" should read --parts of--.

COLUMN 2

Line 2,  "influential" should read --inferential--;
Line 30, "FIGS. 2" should read --FIG. 2--.

COLUMN 3

Line 6,  "Process" should read --A process--; and "from"
         should read --from a--; and "that" should read
         --that a--;

UNITED STATES PATENT AND TRADEMARK OFFICE
CERTIFICATE OF CORRECTION

PATENT NO. : 5,528,752

DATED : June 18, 1996

INVENTORS : TAKASHI KISE ET AL.

It is certified that error appears in the above-identified patent and that said Letters Patent is hereby corrected as shown below:

COLUMN 3 continued

```
Line 7,   "while" should read --while a--;
Line 17,  "influential" should read --inferential--;
Line 36,  "influential" should read --inferential--;
Line 59,  "stores" should read --stores the--;
Line 63,  "influences" should read --inferences--.
```

COLUMN 4

```
Line 6,   "an" should read --a--;
Line 7,   "a" should read --an--;
Line 40,  "is" should read --being--.
```

COLUMN 5

```
Line 61,  "of" (first occurrence) should read --of the--.
```

COLUMN 6

```
Line 16,  "normal." should read --normal,--;
Line 17,  "A" should read --the--;
Line 18,  "obtained," should read --obtained, and--;
Line 43,  "processes" should read --process--.
```

UNITED STATES PATENT AND TRADEMARK OFFICE
CERTIFICATE OF CORRECTION

PATENT NO. : 5,528,752

DATED : June 18, 1996

INVENTORS : TAKASHI KISE ET AL.

It is certified that error appears in the above-identified patent and that said Letters Patent is hereby corrected as shown below:

COLUMN 7

Line 5, "has" should read --have--;
Line 7, "show" should read --shows--;
Line 16, "since influential" should read --since the inferential--;
Line 17, "using" should read --using a--;
Line 18, "to" should read --to a--;
Line 63, "of" should read --of the--;
Line 64, "check" "measurement"" should read --"check", "measurement",--.

COLUMN 9

Line 5, "noimageatall" should read --no-image-at-all"--;
Line 10, "up" should be deleted;
Line 19, "noimageatall" should read --no-image-at-all"--;
Line 20, "is" should read --are--.
Line 38, "another" should read --other--.

COLUMN 10

Line 6, "(1) the explored...fault." should be ¶ ;
Line 8, "(2) It is...diagnosis." should be ¶ ;
Line 49, "therefore intended to" should read --therefore are intended to be--.

UNITED STATES PATENT AND TRADEMARK OFFICE
CERTIFICATE OF CORRECTION

PATENT NO. : 5,528,752

DATED : June 18, 1996

INVENTORS : TAKASHI KISE ET AL.

It is certified that error appears in the above-identified patent and that said Letters Patent is hereby corrected as shown below:

<u>COLUMN 13</u>

Line 20, "of" should read --of a--.

<u>COLUMN 14</u>

Line 12, "data on which" should read --on which data--;

Signed and Sealed this

Twenty-sixth Day of November 1996

Attest:

BRUCE LEHMAN

Attesting Officer

Commissioner of Patents and Trademarks